(12) United States Patent
Freter

(10) Patent No.: US 10,697,557 B2
(45) Date of Patent: Jun. 30, 2020

(54) TANK VENTILATION VALVE, TANK VENTILATION SYSTEM AND METHOD FOR KEEPING OPEN AN ELECTROMAGNETICALLY ACTIVATED VALVE

(71) Applicant: A. Kayser Automotive Systems GmbH, Einbeck (DE)

(72) Inventor: Heiko Freter, Einbeck (DE)

(73) Assignee: A. Kayser Automotive Systems GmbH, Einbeck (DE)

( * ) Notice: Subject to any disclaimer, the term of this patent is extended or adjusted under 35 U.S.C. 154(b) by 0 days.

(21) Appl. No.: 16/244,522

(22) Filed: Jan. 10, 2019

(65) Prior Publication Data

US 2019/0249793 A1 Aug. 15, 2019

(30) Foreign Application Priority Data

Feb. 12, 2018 (DE) .......................... 10 2018 001 118

(51) Int. Cl.
*F16K 31/06* (2006.01)
*F16K 24/04* (2006.01)

(52) U.S. Cl.
CPC .......... *F16K 31/0655* (2013.01); *F16K 24/04* (2013.01)

(58) Field of Classification Search
CPC .............................. F16K 31/0655; F16K 24/04
See application file for complete search history.

(56) References Cited

U.S. PATENT DOCUMENTS

| 702,157 | A | * | 6/1902 | Schreidt .............. F16K 31/0655 |
|---|---|---|---|---|
| | | | | 137/495 |
| 2,251,441 | A | | 8/1941 | Dillman |
| 5,029,807 | A | | 7/1991 | Fuchs |
| 5,599,003 | A | | 2/1997 | Seemann et al. |
| 6,047,945 | A | | 4/2000 | Grove et al. |
| 6,843,271 | B2 | * | 1/2005 | Weldon ................... F16K 24/04 |
| | | | | 123/516 |
| 9,464,728 | B2 | | 10/2016 | Herrmann |
| 2002/0149456 | A1 | | 10/2002 | Krimmer et al. |

FOREIGN PATENT DOCUMENTS

| DE | 3814765 A1 | 11/1989 |
|---|---|---|
| DE | 4326838 A1 | 2/1995 |
| DE | 19649225 A1 | 5/1998 |
| DE | 10051310 A1 | 1/2002 |
| DE | 102010044336 A1 | 3/2012 |
| DE | 102011114120 A1 | 3/2013 |
| DE | 102012207584 A1 | 11/2013 |

* cited by examiner

*Primary Examiner* — Umashankar Venkatesan
(74) *Attorney, Agent, or Firm* — Richard M. Goldberg

(57) ABSTRACT

The invention relates to a tank ventilation valve for a motor vehicle for selectively enabling or blocking a fluid flow, including a valve body (10) or tappet, which is linearly movable in one direction (R1) and another direction (R2) opposite to the one direction to selectively open or close a valve passage (D); at least one spring (20) for urging the valve body (10) in the one direction (R1), an actuator for moving the valve body (10) in the other opposite direction (R2) against the force applied by the spring (20), and a blocking element (50) for blocking the valve body (10) such that a movement of the valve body (10) in the one direction (R1) is blocked.

14 Claims, 16 Drawing Sheets

TANK VENTILATION VALVE, TANK VENTILATION SYSTEM AND METHOD FOR KEEPING OPEN AN ELECTROMAGNETICALLY ACTIVATED VALVE

BACKGROUND OF THE INVENTION

The present invention relates to a tank ventilation valve, to a tank ventilation system for a motor vehicle and to a method for keeping open an electromagnetically actuated valve of the normally closed type.

In motor vehicles, fuel vapors from a fuel tank are to be retained by a vent line to the atmosphere being closed by a valve during motor standstill and being opened only during operation of the engine, so that by the removal of fuel, air can enter the tank to prevent negative pressure in the tank. In addition, an activated carbon canister is provided in the vent line to absorb fuel vapors therein. During operation of the engine, the activated carbon canister is regenerated by drawing combustion air from the engine through the activated carbon filter.

Before a fuel cap is opened, the vent line must be opened to relieve any overpressure in the fuel tank in order to prevent fuel from spurting out of the open fuel cap. Furthermore, the vent line must be opened for refueling the fuel tank, so that the displaced air can escape through the vent line and spurting out of fuel from the open tank cap is prevented.

For this purpose, an electromagnetically actuated on/off valve is arranged in the vent line, which is normally closed and can be opened by corresponding activation of an electromagnet. Such valves are disclosed for example in DE 10 2010 044 336 A1 and DE 10 2011 114 120 A1.

During assembly line production of motor vehicles, a certain minimum amount of fuel must be filled into the fuel tank, so that a final inspection of the vehicle can be carried out and the vehicle can be moved independently after completion. Here, the vent valve of the fuel tank must be energized to open the vent line. However, a fully operational electrical control may not be available and ready for use during assembly line production. Therefore, to open the tank ventilation valve, the tank ventilation valve must be opened externally with a corresponding special control to refuel the vehicle that has not been finished yet. Such a procedure is cumbersome and takes a long time, so that the entire assembly line production is delayed thereby.

SUMMARY OF THE INVENTION

Thus, it is the object of the invention to improve a tank ventilation valve and the corresponding tank ventilation system to the effect that a first refueling during assembly line production of a motor vehicle can be simplified and accelerated.

This object is solved by the features of the independent claims. Advantageous embodiments are subject of the dependent claims.

According to a first aspect, there is provided a motor vehicle tank ventilation valve for selectively enabling or blocking a fluid flow, comprising:

a valve body or tappet, which is linearly movable in one direction and another direction opposite to said one direction to selectively open or close a valve passage;

at least one spring for urging the valve body in said one direction, an actuator for moving the valve body in the other opposite direction against the force applied by the spring, and a blocking element for blocking the valve body such that a movement of the valve body in said one direction is blocked.

By the blocking element blocking the valve body such that the valve body cannot be moved in said one direction, the valve body is blocked in an intermediate position between the fully open position and the fully closed position. In this way, the valve is open in the non-activated or normal state, although it is a valve that is closed in the non-activated or de-energized state.

In this way, a fuel tank can be filled with fuel in a simple and quick way during the assembly line production of motor vehicles, because in this position of the blocking element of a tank ventilation valve, the vent line of the fuel tank is open. An external device for energizing or activating the tank ventilation valve is not required for this tank ventilation valve according to the invention. In this way, the refueling process of a first refueling can be performed on a conveyor belt in a quick and easy manner.

Preferably, the valve passage is closed by abutment of a sealing plate of the valve body to a valve seat when the valve body is moved by the spring in said one direction.

More preferably, the blocking element is movable between a blocked position for blocking the valve body and a release position for releasing the valve body and, in the blocked position, engages the valve body or an element connected thereto, such as a magnet armature or a stop ring.

By the engagement of the blocking element, the blocked position can be canceled only by opening the valve and thus releasing the engagement.

Preferably, the blocking element has an elastically restorable blocking member, which, in the unloaded or undeformed state, is in the release position and can be transferred to the blocked position for blocking the valve body by elastically restorable deformation.

By the blocking element having an elastically restorable blocking member, which is elastically restored to the non-blocking position after initial actuation of an electromagnet of the tank ventilation valve, the valve can be completely closed after deactivation of the electromagnet. No further step is required to deactivate the blocking element.

Further preferably, the elastically restorable blocking member can be deformed elastically restorable via an inlet opening or an outlet opening of the valve by means of a tool inserted therein.

The blocking element acts only in the delivery state of the tank ventilation valve by the blocking member being elastically restorably deformed with a corresponding tool, so that the blocking member engages the valve body or an element connected thereto, such as a magnet armature or a stop ring.

By energizing the electromagnet, the engagement of the blocking member with the valve body is released and the tank ventilation valve is transferred to the fully open state. By releasing the engagement of the blocking member with the valve body, the blocking member is elastically restored to the unblocked position, so that after deactivation of the electromagnet, the valve body can be transferred to the fully closed position of the tank ventilation valve. The blocking element with the blocking member thus has no function after the first activation of the tank ventilation valve and does not interfere with the actuation of the tank ventilation valve during operation of the motor vehicle.

Preferably, the elastically restorable state of the blocking member is maintained by the blocking member engaging with the valve body or an element connected thereto, such as a magnet armature or a stop ring.

Further preferably, the actuator has an electromagnet that, upon activation, pulls the valve body in the other direction against the spring force.

Preferably, the valve is closed in the non-activated state of the actuator by the spring pressing the valve body against the valve seat.

In another aspect, a tank ventilation system having an atmosphere port and a tank ventilation valve as described above is provided.

According to another aspect, there is provided a method of keeping open an electromagnetically actuated valve of the normally closed type, comprising the steps of: opening the valve by activating an actuator of the valve, displacing a blocking element or a blocking member connected to the blocking element into a blocking position, deactivating the actuator, so that a valve body or an element connected thereto, such as a magnet armature or a stop ring, engages the blocking element or blocking member such that a movement of the valve body into the closed position of the valve is prevented.

BRIEF DESCRIPTION OF THE DRAWINGS

The invention will now be explained in more detail by means of embodiments with reference to the accompanying drawings.

DETAILED DESCRIPTION

Figure 1:
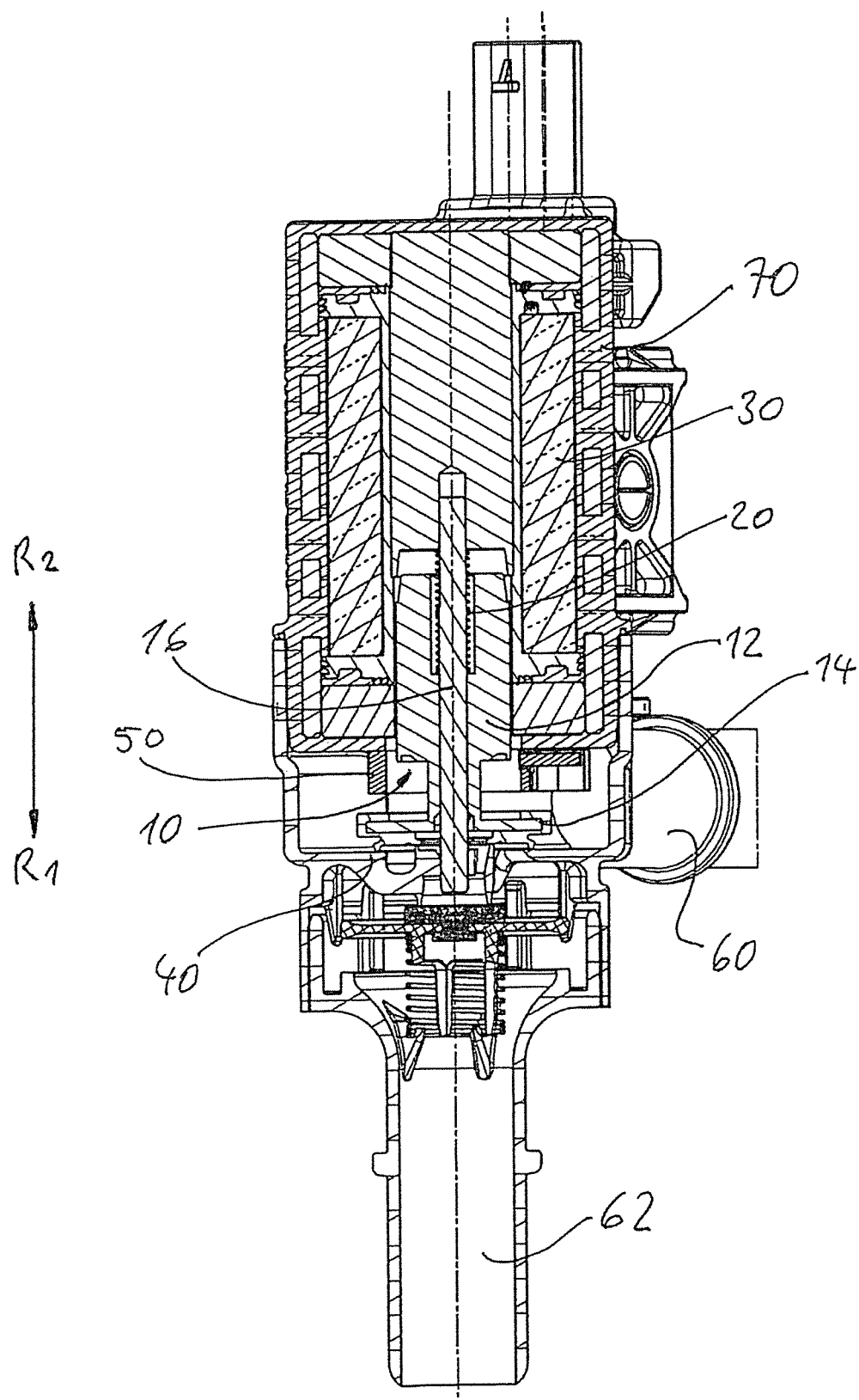
FIG. 1 shows a section through an inventive tank ventilation valve in the closed position according to a first embodiment of the invention.
Figure 2:
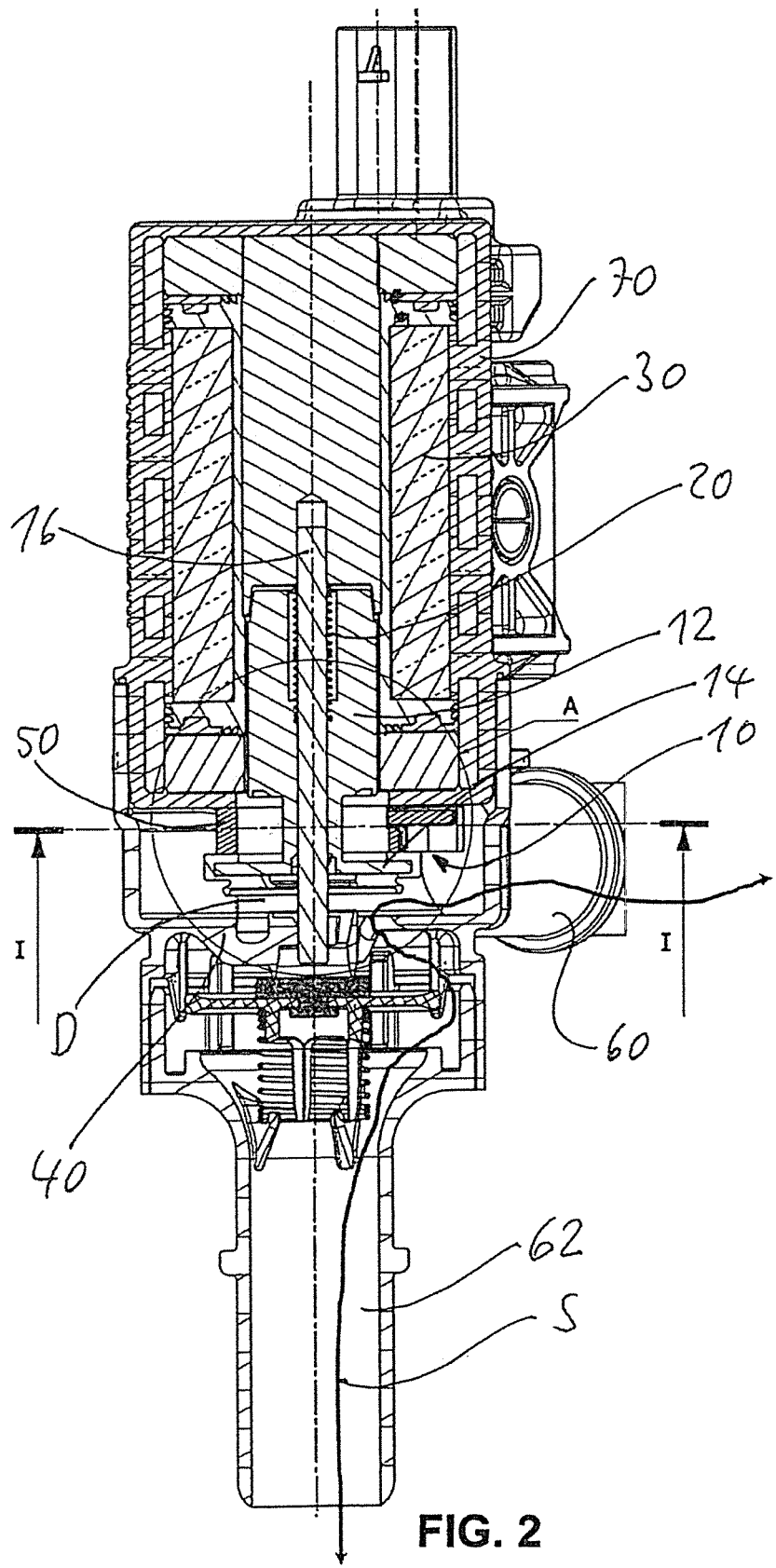
FIG. 2 shows the tank ventilation valve of FIG. 1 in the open position, in which a flow is made possible.

As shown in the sectional views of FIGS. 1 and 2, an electromagnet 30 cooperating with a magnet armature 12 is accommodated in a housing 70 of a tank ventilation valve. In the views of FIGS. 1 and 2, the magnet armature 12 is pressed down by a spring 20 in a direction R1 in order to press a sealing plate 14 of the valve against a valve seat 40.

In the closed position of the valve shown in FIG. 1, in which the sealing plate 14 is pressed against the valve seat 40, fluid flow through the valve is prevented.

However, when the electromagnet 30 is energized, an electromagnetic force is generated, which pulls the magnet armature 12 up in another direction R2 against the spring force of the spring 20 in FIG. 2, so that the sealing plate 14 connected to the magnet armature 12 lifts off from the valve seat 40. Thus, a flow path S shown in FIG. 2 is released through the valve from a first valve port 60 to a second valve port 62 via the passage D released by the seal plate 14 and the valve seat 40.

Said one direction R1, in which the spring 20 acts, is opposite to the other direction R2, in which the magnet armature 12 is moved upon activation of the electromagnet 30.

As an actuator for actuating the valve, valves of this type use a drive with the electromagnet 30, which is connected directly or indirectly to the sealing element in the form of the sealing plate 14. With the electromagnet 30 turned off, the spring 20 holds the valve closed by pressing the magnet armature 12 against the valve seat 40. The flow direction of the medium through the valve is usually set such that when the valve is closed, the differential pressure building up between inlet and outlet of the valve additionally presses the sealing plate 14 against the valve seat 40. Depending on the application, however, the flow direction can also be reversed.

To open the valve, the sealing plate 14 must be lifted from the valve seat 40 by the electromagnetic drive. The actuator or drive must therefore work against the spring 20 and against the differential pressure applied to the sealing plate 14. The minimum required force of the electromagnetic drive to open the valve mainly depends on the spring force, the valve seat size (area) and the maximum differential pressure with the valve closed.

Here, the magnet armature 12 is preferably guided axially via a guide pin 16. By deactivating the electromagnet 30, the electromagnetic force is reduced by reducing the magnetic field, so that the spring 20 can press the magnet armature 12 back down to return the valve from the open position shown in FIG. 2 to the closed position shown in FIG. 1.

Furthermore, between the sealing plate 14 and the magnet armature 12, a blocking element 50 is arranged, which has no function in the positions shown in FIGS. 1 and 2 and will be explained in more detail below with reference to the further figures, in particular FIGS. 4 to 7.

The magnet armature 12, which is movable along its guide pin 16 and has the sealing plate 14 at its lower end, forms a valve body 10 in the valve of FIGS. 1 and 2. It is clear that the magnet armature 12 could be designed separately from a valve body and could be guided axially in a way other than by the guide pin 16.

Figure 3:
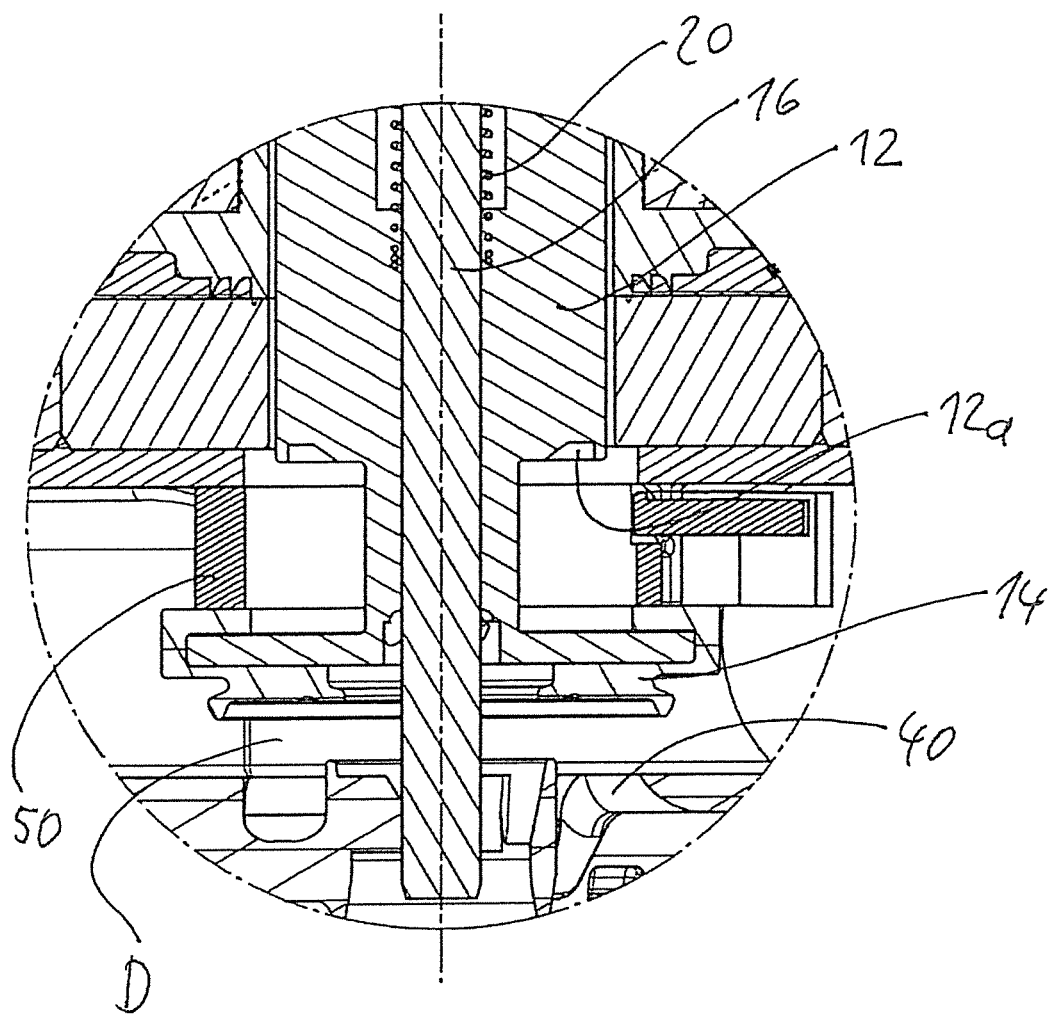
FIG. 3 shows a detailed view of FIG. 2 in the region of the valve seat.
Figure 4:
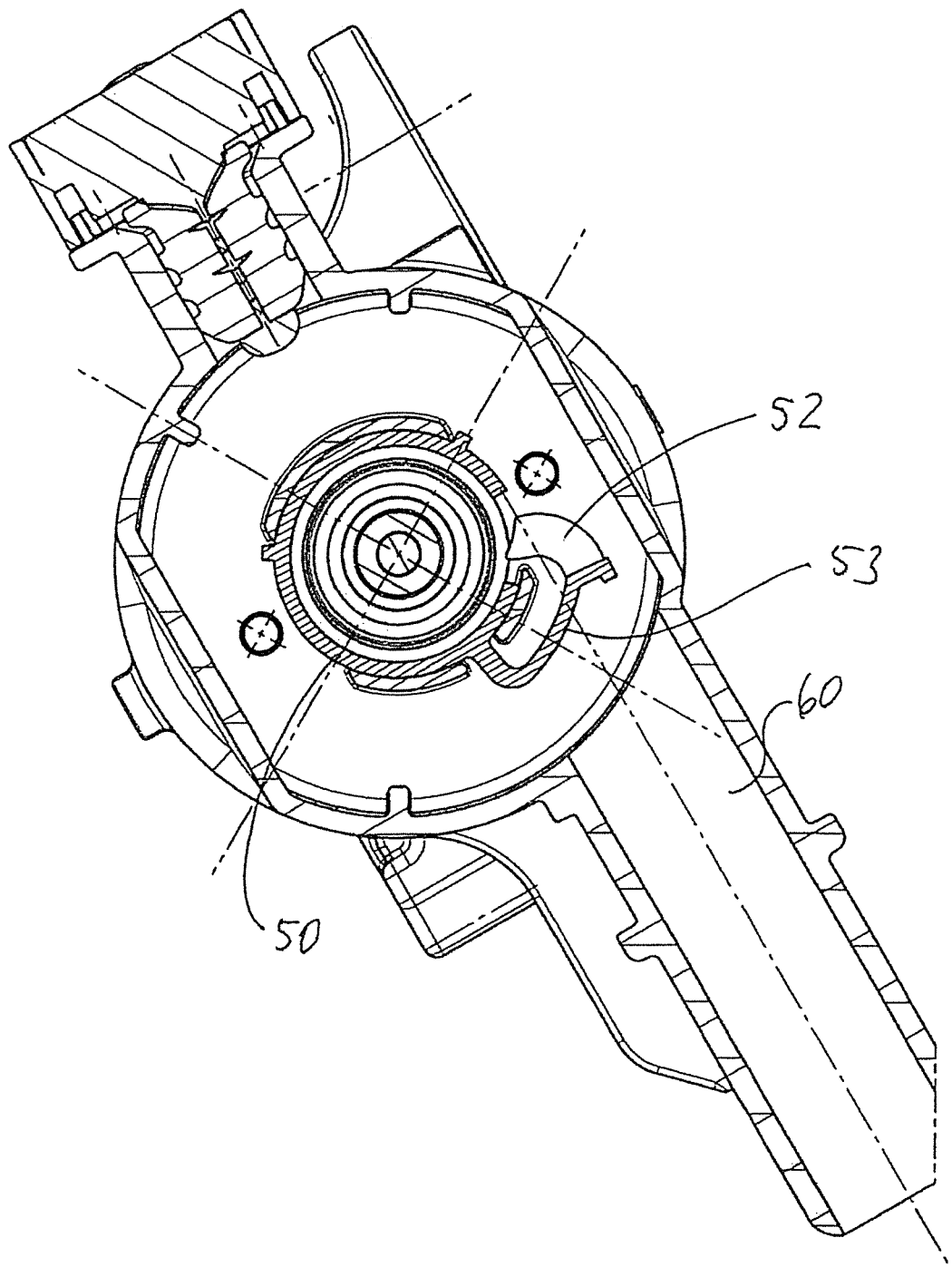
FIG. 4 shows a bottom view of the blocking element in the release position.

As shown in the detailed view of FIG. 3, the magnet armature 12 further has a groove 12a on a lower end face thereof, with which a blocking member 52 of the blocking element 50 can engage, as will be explained below. As shown in FIG. 4, this blocking member 52 is arranged at the end of an elastically restorable arm 53 of the blocking element 50. The blocking element 50 is a substantially circular element that is fixedly mounted in the valve and also after initial activation, i.e. after fulfilling its function, namely blocking in the delivery state, remains permanently in the valve.

Figure 5:
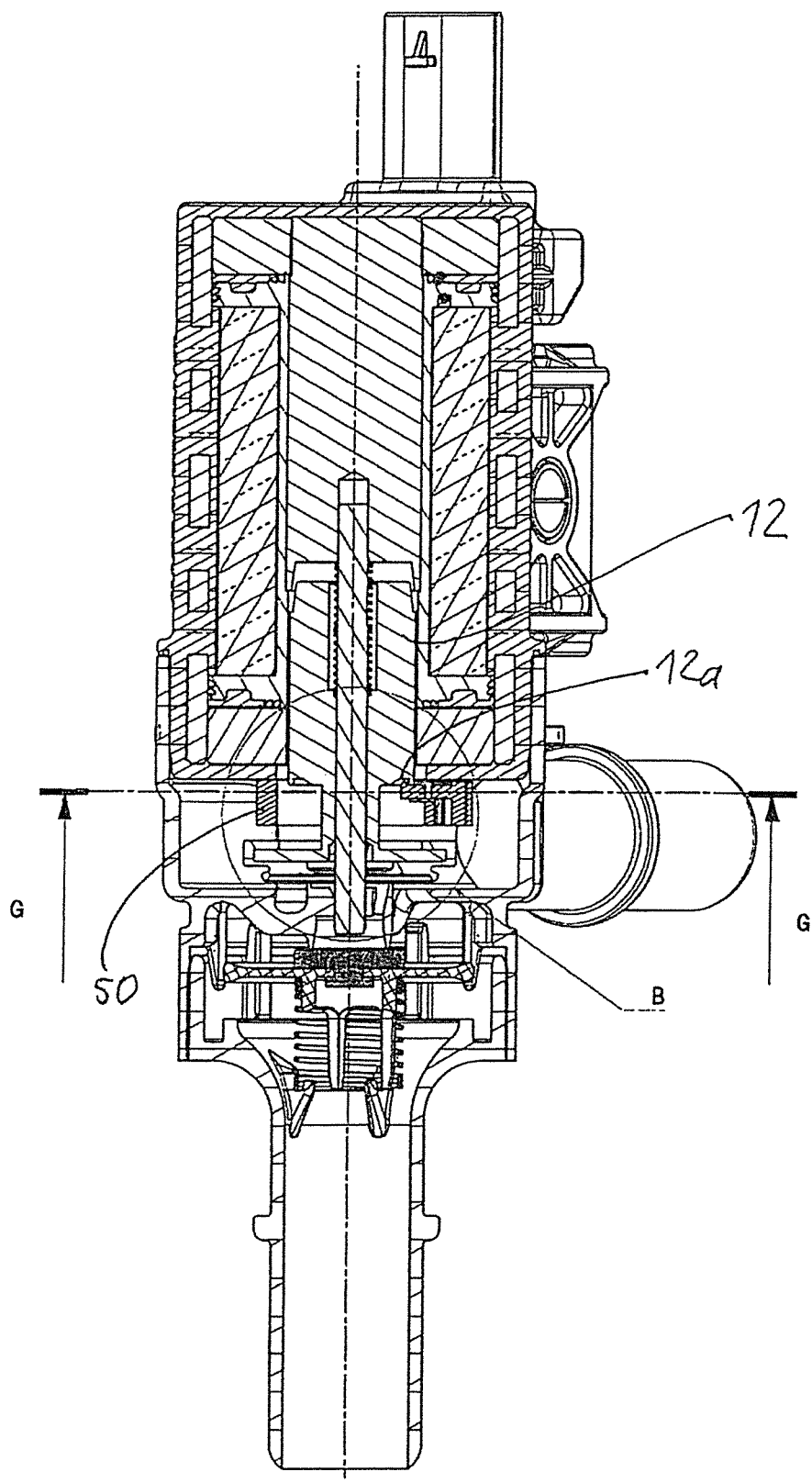
FIG. 5 shows a sectional view similar to FIG. 1 and FIG. 2, but in the blocking position of the blocking element, in which the valve is partially open and is blocked by the blocking element.

Hereinafter, the blocking operation by the blocking member 50 will be explained in more detail with reference to FIGS. 5 to 7. FIG. 5, similar to FIGS. 1 and 2, shows a sectional view of the valve, but in a partially open position, i.e. in an intermediate position between the fully open position of FIG. 2 and the fully closed position of FIG. 1. This intermediate position shown in FIG. 5 is achieved by blocking by the blocking element 50.

Figure 6:
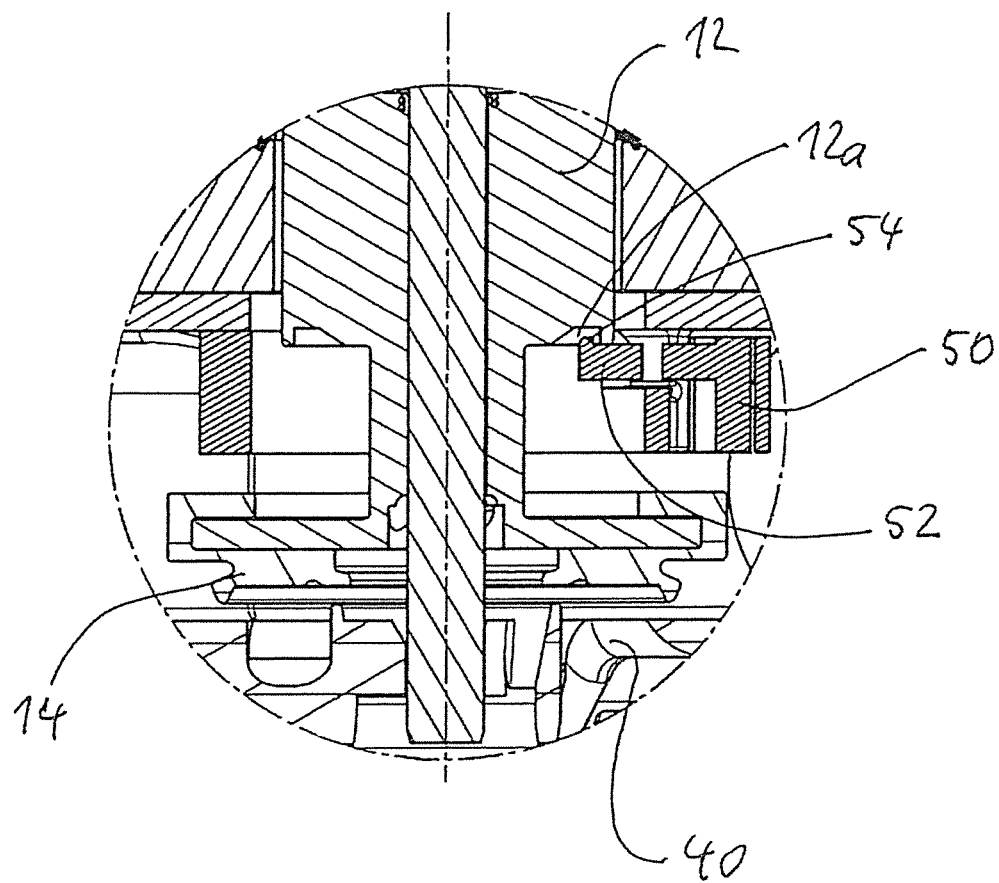
FIG. 6 shows a detailed view of FIG. 5.

As shown in particular in the detailed view of FIG. 6, in the blocking position of the blocking element 50, the blocking member 52 is displaced radially inward such that it is blocks or prevents a downward movement of the magnet armature 12. In this position, the intermediate position of the magnet armature 12 results on the one hand due to the spring force by the spring 20, and on the other hand due to the abutment of the magnet armature 12 on the blocking element 52. The blocking element 52 thus blocks the magnet armature 12 in an intermediate position, in which the sealing plate 14 is lifted off from the valve seat 40.

Here, a projection 54 in the form of a protruding nose enters the groove 12a of the magnet armature 12. In this way, the blocking member 52 is locked to the magnet armature 12 and cannot be moved radially outward anymore.

Figure 7:
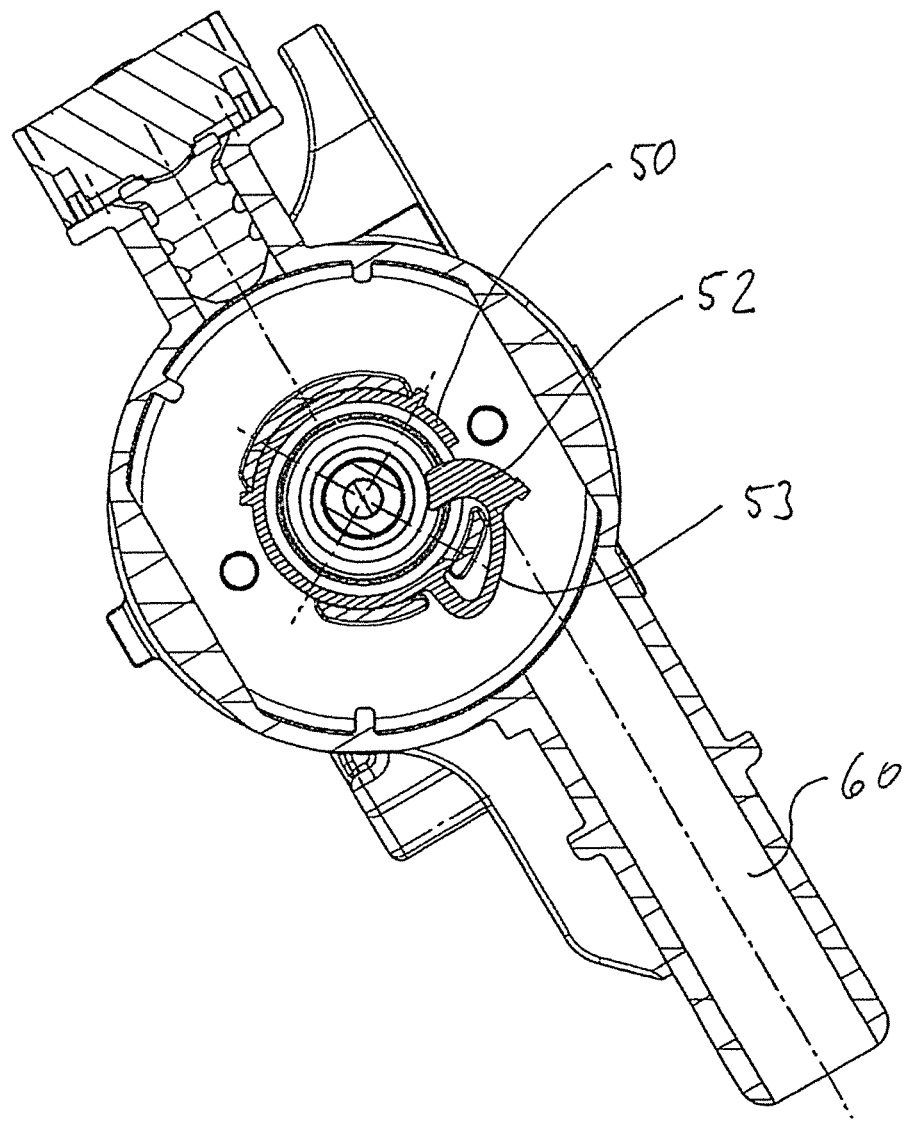
FIG. 7 shows a bottom view of the blocking element in the blocking position.

FIG. 7 shows a bottom view of the blocking member 52 in the blocked position, in which the projection 54 enters the groove 12a of the magnet armature 12. In this position, the elastically restorable arm 53 is elastically deflected and would push the blocking member 52 radially outward due to its elastic restoring force. However, this restoring movement of the blocking member 52 is prevented by the engagement of the projection 54 with the groove 12a of the magnet armature 12. Thus, this blocked state of the blocking element 50 is stable and does not require activation of the electromagnet 30 or any other energy from outside.

This blocked state of the magnet armature 12 in the intermediate position of the tank ventilation valve corresponds to the delivery state of the tank ventilation valve. In this state, the valve is partially opened and a refueling operation of a first refueling of a motor vehicle on the assembly line can be performed easily without having to energize the electromagnet 30 of the tank ventilation valve.

After completion of the motor vehicle and completion of the corresponding electrical control, the blocking element 50 is deactivated upon first actuation of the electromagnet 30 and corresponding upward movement of the magnet armature 12. In an activated state of the electromagnet 30 and corresponding upward movement of the magnet armature 12, the engagement of the projection 54 of the blocking element 50 with the groove 12a of the magnet armature 12 is released and the elastically restorable arm 53 moves radially outward, so that the magnet armature 12 is now freely movable between the closed position of the tank ventilation valve shown in FIG. 1 and the open position of the tank ventilation valve shown in FIG. 2.

The blocking element 50 remains in this state within the valve and does not need to be removed. After the first activation of the tank ventilation valve, the blocking element 50 has no function anymore. It merely serves to keep open the tank ventilation valve in the delivery state, so that a first refueling can be carried out in a simple manner and without power supply to the electromagnet 30. After first actuation of the tank ventilation valve by energizing the electromagnet 30, the blocking position shown in FIGS. 6 and 7 is released by the resilient arm 53 pulling the blocking member 52 radially outward from the blocked position.

Figure 8:
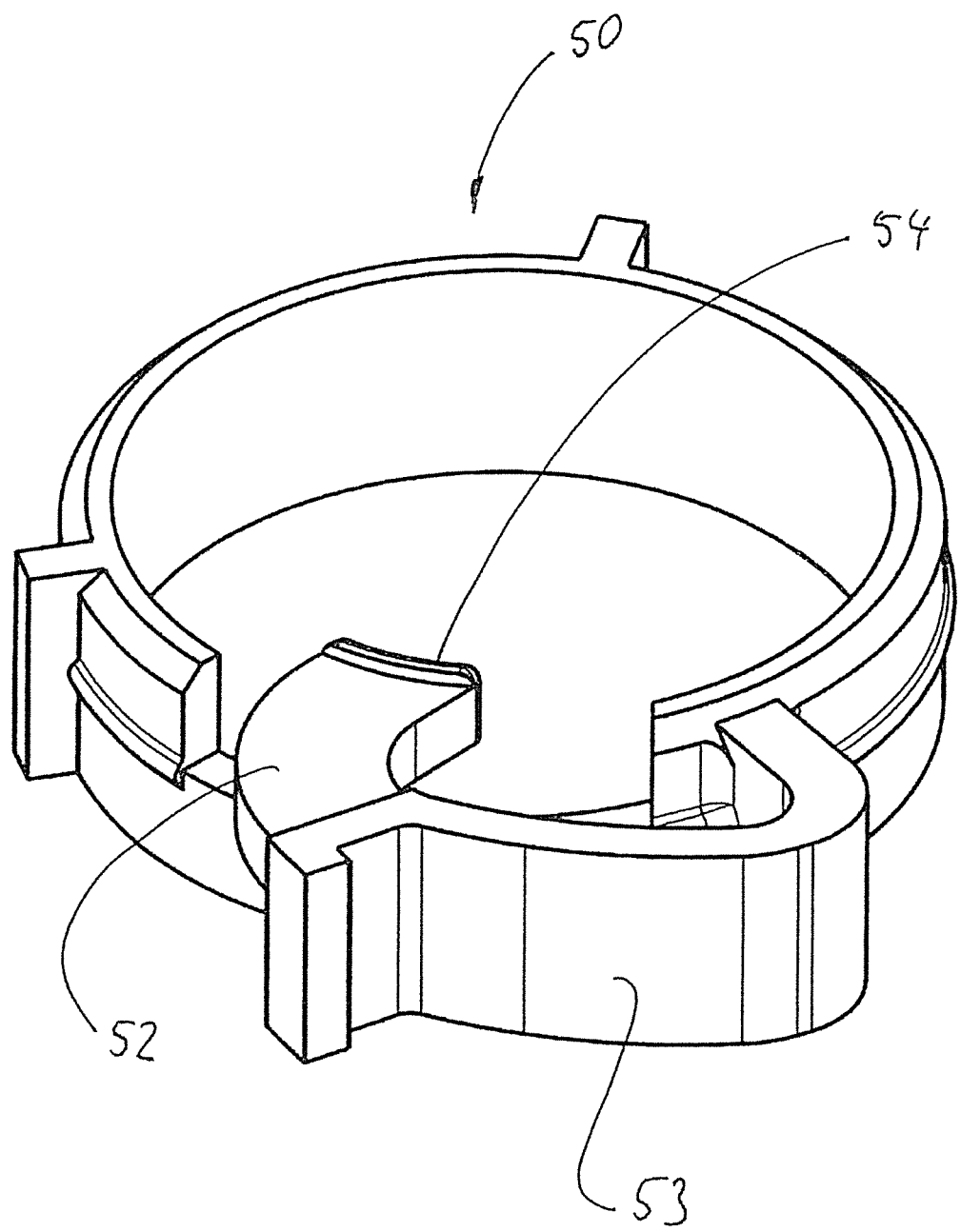
FIG. 8 shows a perspective detailed view of the blocking element.

FIG. 8 shows a perspective detailed view of the blocking element 50 with the blocking member 52, which is arranged at the free end of the elastically restorable arm 53. On an upper side of the blocking member 52 there is arranged the projection 54, which can engage the groove 12a of the magnet armature.

To create the blocked state, the completed tank ventilation valve is energized so that it is transferred to the open position shown in FIG. 2. In this state shown in FIG. 2, the elastically restorable arm 53 is pressed radially inward to the blocking position via the first valve port 60 with a tool (not shown), and thereafter the power supply to the electromagnet 30 is suspended, so that the magnet armature 12 moves down and is pressed against the blocking member 52. In this blocking position, the projection 54 engages the groove 12a of the magnet armature 12.

In this way, the blocked state of the blocking element 50 is maintained. This position of the blocking element 50 shown in FIGS. 6 and 7 is the delivery state of the valve, in which the tank ventilation valve is installed in the motor vehicle and its tank ventilation system. In this way, the valve is partially open in the delivery state, so that the first refueling of the motor vehicle can be performed in a simple manner without having to activate the valve.

FIGS. 9 to 16 show a second embodiment, which is constructed similar to the first embodiment. Accordingly, the same reference numerals are used for the same elements. Their execution and function is not specified here any further to avoid repetition. Instead, only the differences to the first embodiment will be explained.

The magnet armature 12 of the second embodiment has no guide pin 16, but instead a guide bush 17 on its outer periphery.

Figure 9:
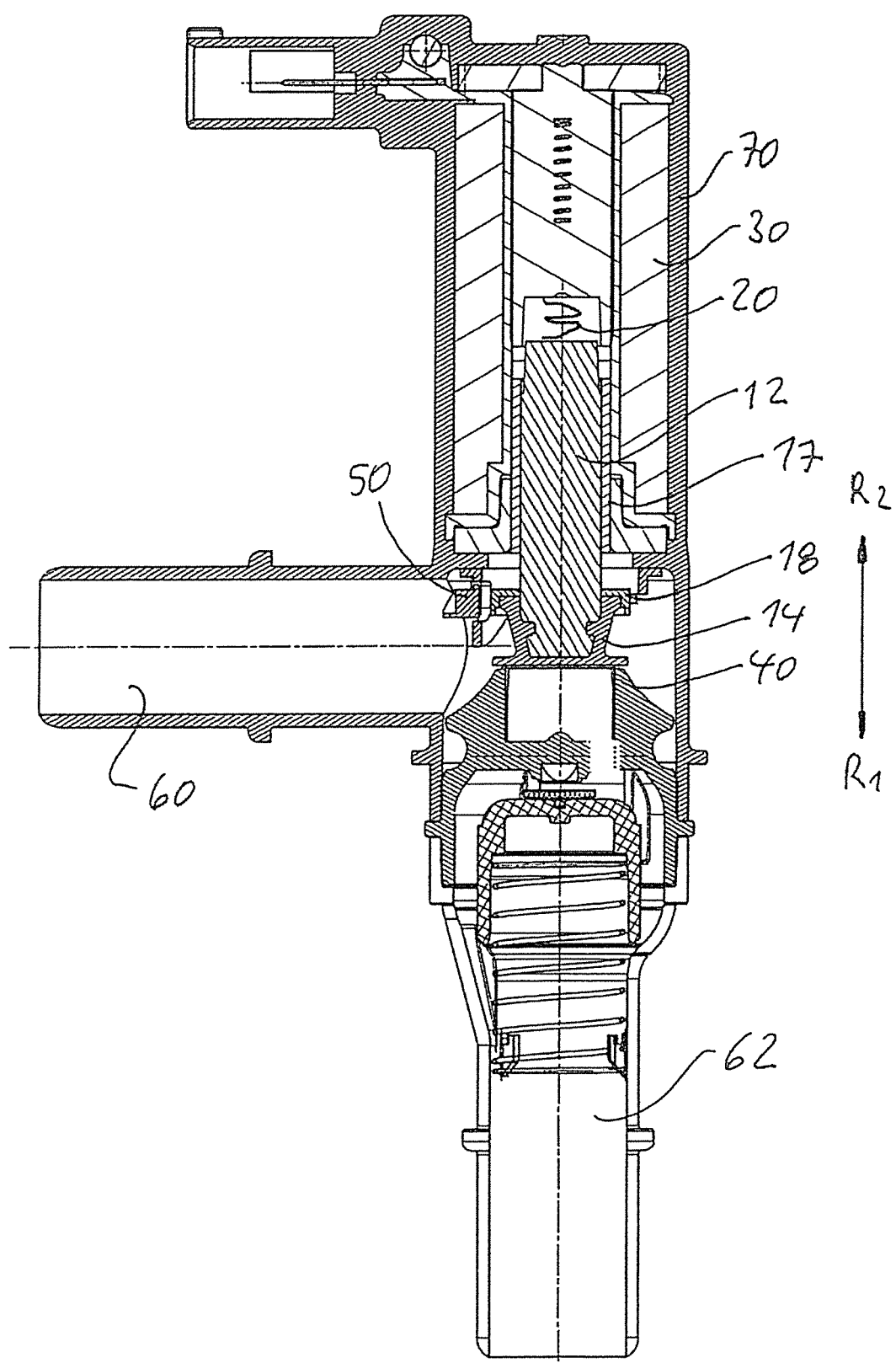
FIG. 9 shows a sectional view of an inventive valve according to a second embodiment in the closed position.
Figure 10:
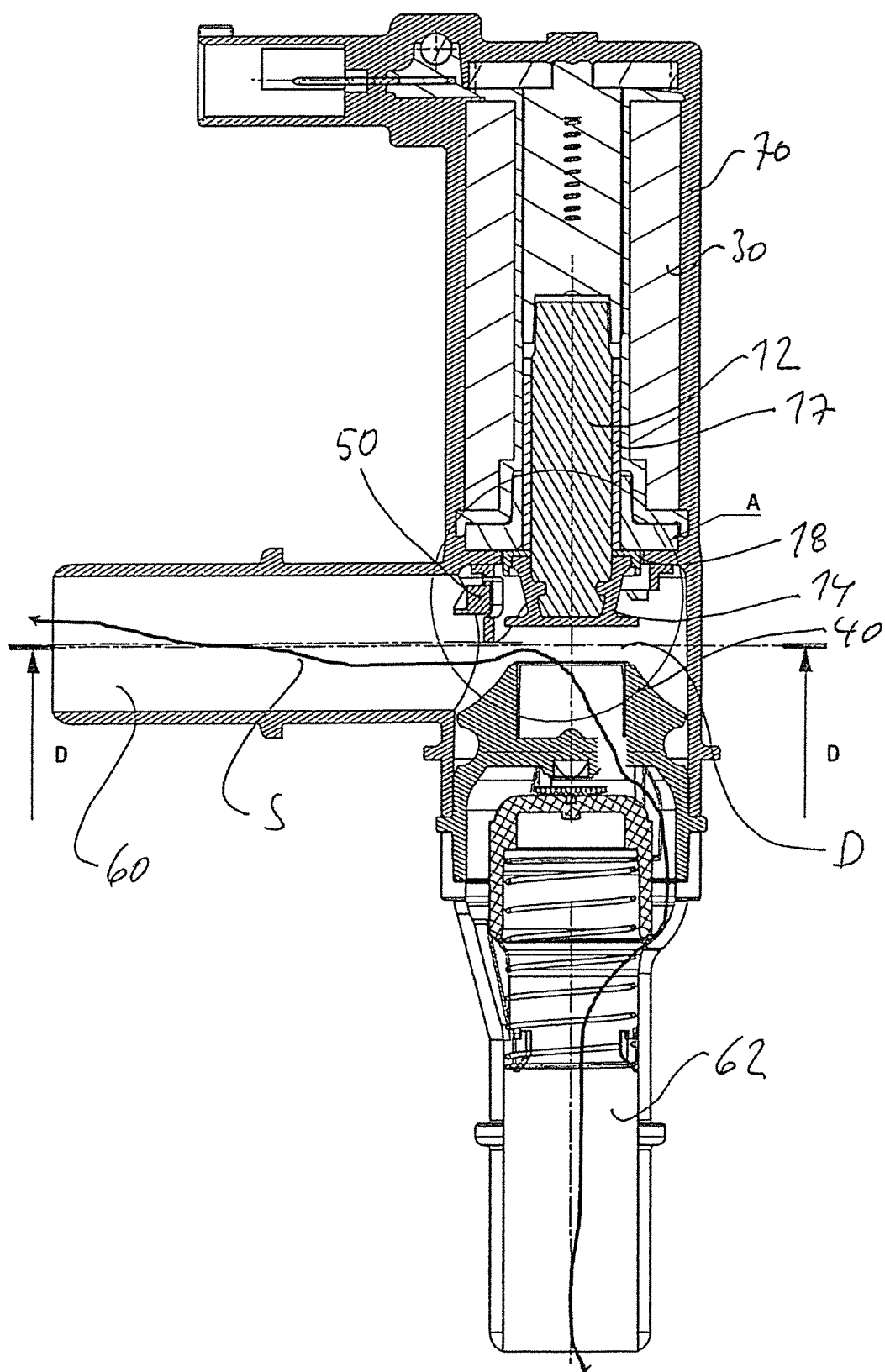
FIG. 10 shows a sectional view of the valve of FIG. 9 in the open position.

FIG. 9 shows, in accordance with FIG. 1, the closed state of the tank ventilation valve, and FIG. 10 shows, in accordance with FIG. 2, the open state of the tank ventilation valve with the flow path S through the valve.

Figure 11:
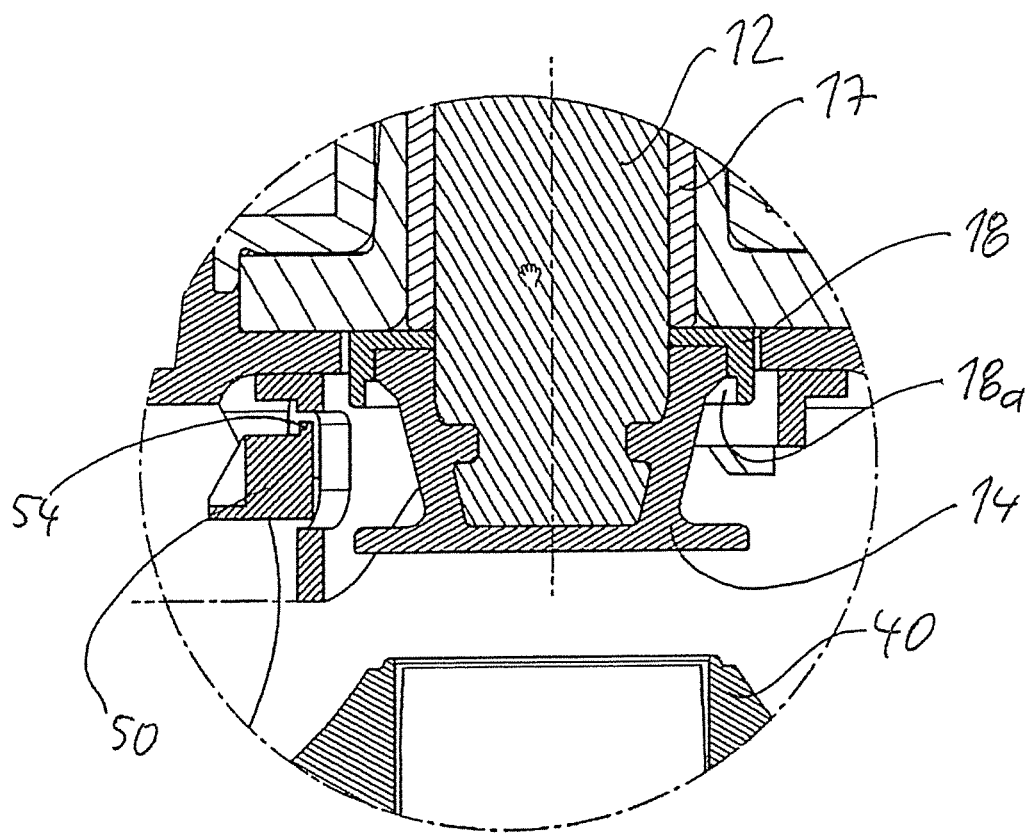
FIG. 11 shows a detailed view of FIG. 10.

The magnet armature 12 of the second embodiment has, as shown in particular in the detailed view of FIG. 11, no groove 12a, but a stop ring 18 with a groove 18a. The stop ring 18 is arranged axially immovable on the outer circumference of the magnet armature 12 and positions the sealing plate 14. The groove 18a of the stop ring 18 serves as an element for engaging the projection 54 of the blocking element 50.

Figure 12:
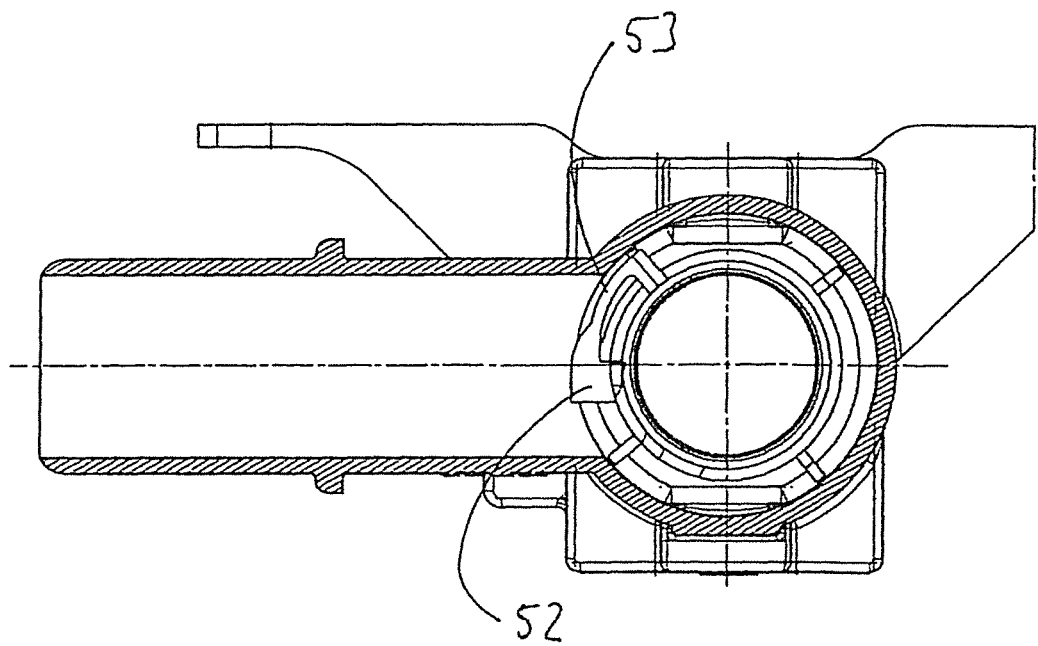
FIG. 12 shows a bottom view of the blocking element in the release position.

FIG. 12 shows a bottom view of the blocking element 50 in the release position, in which a movement of the magnet armature 12 is released. This position of the blocking element 50 from FIG. 12 corresponds to the release position of the blocking element 50 of the first embodiment from FIG. 4.

Figure 13:
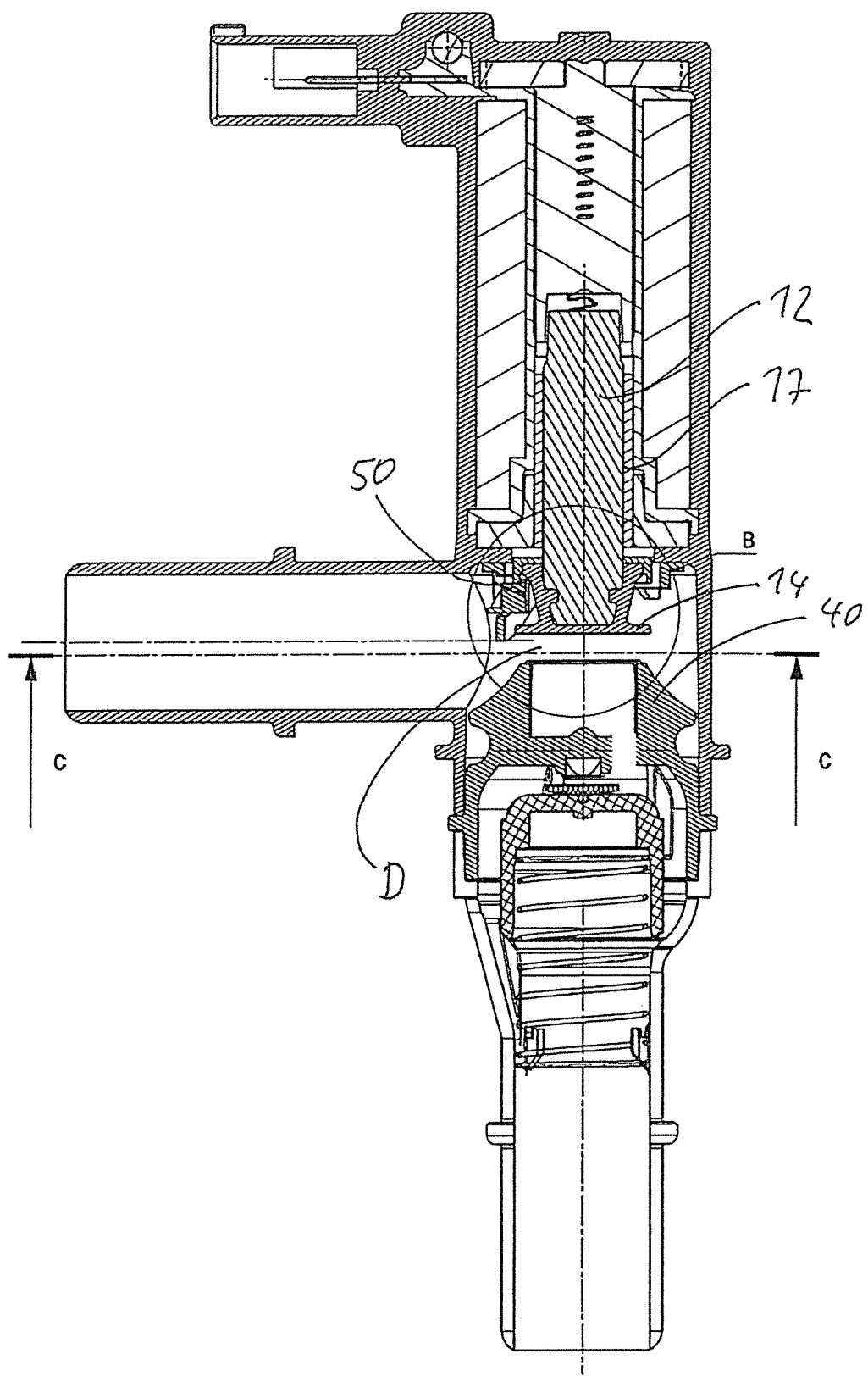
FIG. 13 shows a sectional view of the valve of FIGS. 9 and 10 in the blocking position of the blocking element, in which the valve is partially opened.

FIG. 13 shows, by analogy with FIG. 5 of the first embodiment, a sectional view of the valve, but in a partially open position, i.e. in an intermediate position between the fully open position of FIG. 10 and the fully closed position of FIG. 9. This intermediate position shown in FIG. 13 is achieved by blocking by the blocking element 50.

Figure 14:
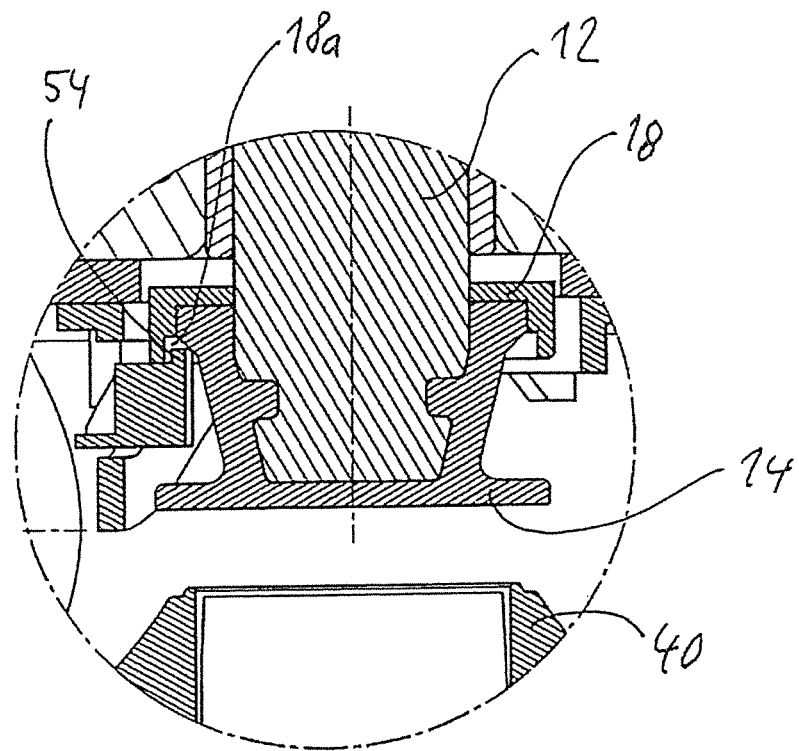
FIG. 14 shows a detailed view of FIG. 13.
Figure 15:
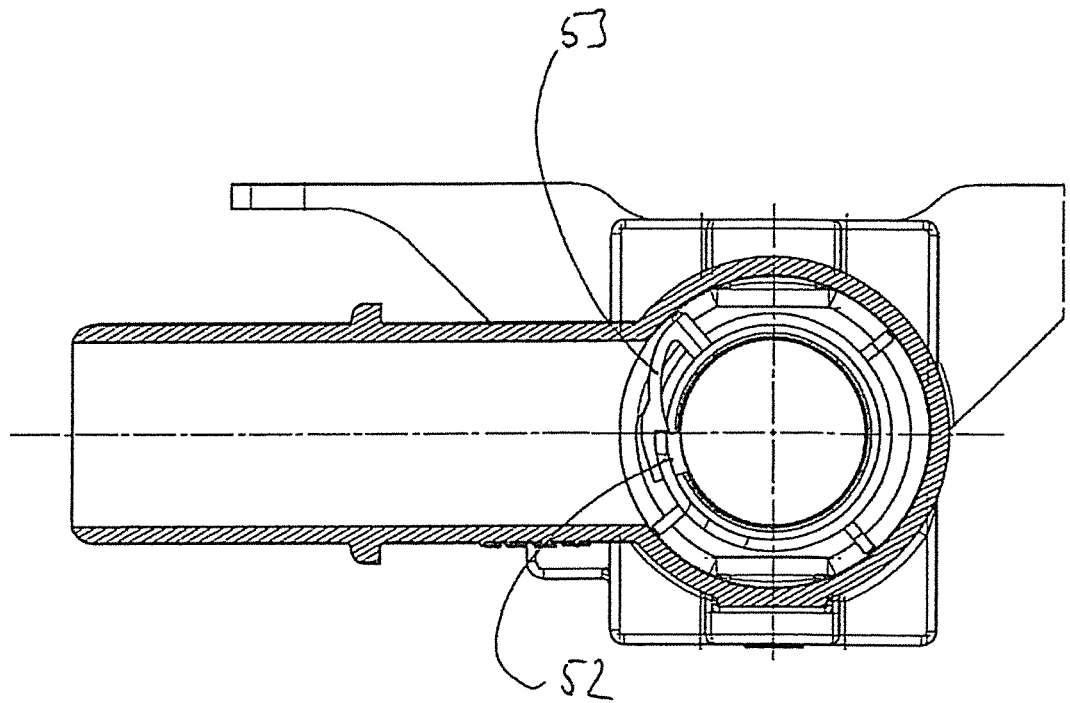
FIG. 15 shows a bottom view of the blocking element in the blocking position.
Figure 16:
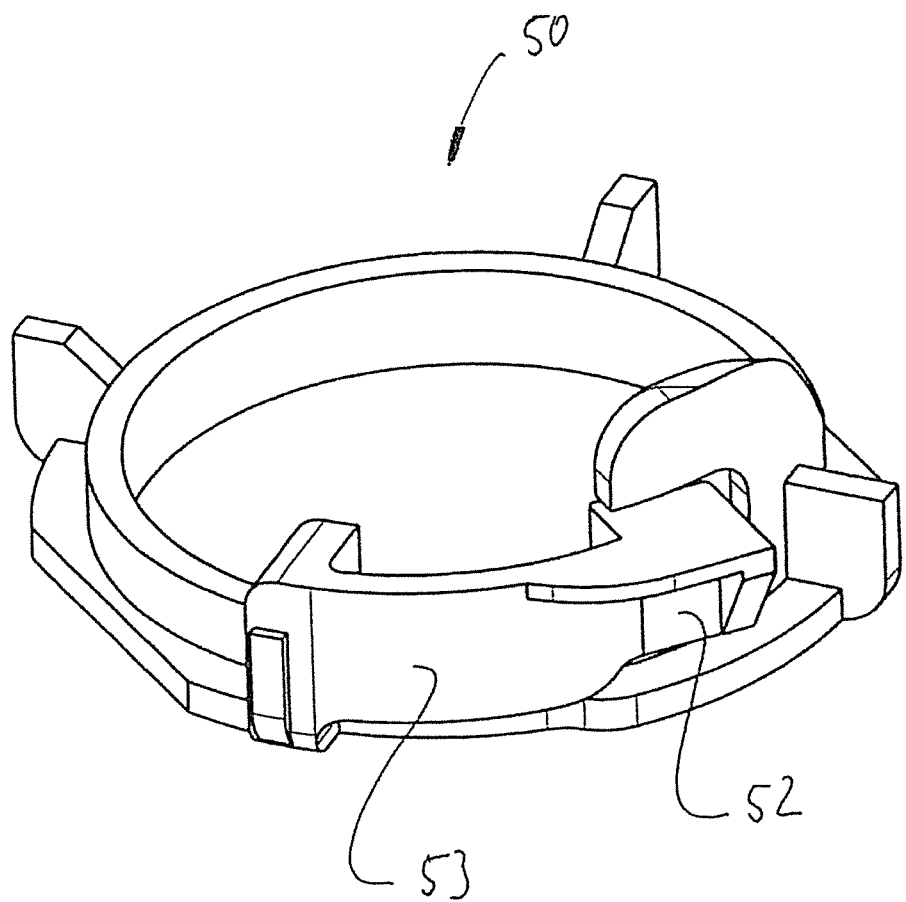
FIG. 16 is a perspective detailed view of the blocking element of the second embodiment.

In particular the detailed view of FIG. 14 shows the engagement between the projection 54 of the blocking member 52 and the groove 18a of the stop ring 18. FIG. 15 shows a bottom view in the blocked position of the blocking element 50 according to FIG. 7 of the first embodiment and FIG. 16 shows a detailed view the blocking element 50 of the second embodiment.

This blocking element 50 of the second embodiment is formed similarly to the blocking element 50 of the first embodiment and also has a blocking member 52 attached to the free end of an elastically restorable arm 53. The blocking element 50 is also circular and remains in the valve after initial activation of the tank ventilation valve and does not need to be removed.

It is understood that the invention is not limited to solenoid valves, but other types of actuators, such as pneumatic or hydraulic actuators, can be used. The tank ventilation valve can also be installed in other places than a tank ventilation system in a motor vehicle, in which it is important that the valve is normally open in the delivery state and, in the operating state after initial activation, is closed in the de-energized state. The blocking element is preferably made of an elastic plastic, such as polyethylene PE, polyamide PA, PVC, etc.

Although the tank ventilation valve described herein is a valve of the directly controlled type, in which the actuator directly lifts the sealing plate 14 by the force of the electromagnet 30, it is also possible to use a pilot-controlled valve, in which a pilot valve is first opened to relieve the differential pressure at the main valve and to facilitate its opening.

LIST OF REFERENCE NUMBERS

10 valve body
12 magnet armature
12a groove
14 sealing plate
16 guide pin
17 guide bush
18 stop ring
18a groove
20 spring
30 electromagnet
40 valve seat
50 blocking element
52 blocking member
53 elastically restorable arm
54 projection
60 first valve port
62 second valve port
70 housing
D valve passage
R1 one direction
R2 other direction
S flow path

The invention claimed is:

1. A tank ventilation valve for a motor vehicle for selectively enabling or blocking a fluid flow, comprising:
   a valve body which is linearly movable in a first direction and a second direction opposite to said first direction to selectively open or close a valve passage,
   at least one spring for urging the valve body in said first direction,
   an actuator for moving the valve body in the second opposite direction against the force applied by the spring, and
   a blocking element for blocking the valve body such that a movement of the valve body in said first direction is blocked,
   wherein the blocking element has an elastically restorable blocking member, which, in an unloaded or undeformed state, is in a release position and is adapted to be transferred to a blocked position for blocking the valve body by elastically restorable deformation.

2. The tank ventilation valve according to claim 1, wherein the valve body includes a sealing plate and the valve passage is closed by abutment of the sealing plate of the valve body to a valve seat when the valve body is moved by the at least one spring in said first direction.

3. The tank ventilation valve according to claim 1, wherein the blocking element is movable between the blocked position for blocking the valve body and the release position for releasing the valve body and, in the blocked position, engages one of:
   the valve body or
   an element connected thereto.

4. The tank ventilation system according to claim 3, wherein the one of the valve body or the element connected thereto includes one of:
   a magnet armature or
   a stop ring.

5. The tank ventilation valve according to claim 1, wherein the valve includes at least one of a first valve port, an inlet opening and an outlet opening and the elastically restorable blocking member is adapted to be deformed elastically restorable via at least one of:
   the first valve port,
   the inlet opening and
   the outlet opening
of the valve by a tool inserted therein.

6. The tank ventilation valve according to claim 5, wherein the elastically restorable state of the blocking member is maintained by the blocking member engaging with one of:
   the valve body or
   an element connected thereto.

7. The tank ventilation system according to claim 6, wherein the one of the valve body or the element connected thereto includes one of:
   a magnet armature or
   a stop ring.

8. The tank ventilation valve according to claim 1, wherein the elastically restorable state of the blocking member is maintained by the blocking member engaging with one of:
   the valve body or
   an element connected thereto.

9. The tank ventilation system according to claim 8, wherein the one of the valve body or the element connected thereto includes one of:
   a magnet armature or
   a stop ring.

10. The tank ventilation valve according to claim 1, wherein the actuator has an electromagnet that, upon activation, pulls the valve body in the second direction against the spring force.

11. The tank ventilation valve according to claim 1, wherein the valve is closed in a non-activated state of the actuator by the spring pressing the valve body against a valve seat.

12. A tank ventilation system according to claim 1, further comprising an atmosphere port and a tank ventilation valve.

13. A method of keeping open an electromagnetically actuated tank ventilation valve of a normally closed type for a motor vehicle for selectively enabling or blocking a fluid flow, according to claim 1, comprising the steps of:
   opening the valve by activating the actuator of the valve,
   displacing one of:
      the blocking element or
      the blocking member connected to the blocking element into a blocking position,
   deactivating the actuator, so that one of:
      the valve body or an element connected thereto engages the blocking element or blocking member such that a movement of the valve body into the closed position of the valve is prevented.

14. The method according to claim 13, wherein the one of the valve body or the element connected thereto includes one of:

a magnet armature or a stop ring.

* * * * *